(12) United States Patent
Velasco

(10) Patent No.: US 10,164,896 B2
(45) Date of Patent: *Dec. 25, 2018

(54) CLOUD-BASED CONTENT MANAGEMENT SYSTEM

(71) Applicant: International Business Machines Corporation, Armonk, NY (US)

(72) Inventor: Marc B. Velasco, Orange, CA (US)

(73) Assignee: International Business Machines Corporation, Armonk, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 13/786,487

(22) Filed: Mar. 6, 2013

(65) Prior Publication Data

US 2013/0185439 A1    Jul. 18, 2013

Related U.S. Application Data

(63) Continuation of application No. 13/352,598, filed on Jan. 18, 2012.

(51) Int. Cl.
    *G06F 15/173*    (2006.01)
    *H04L 12/911*    (2013.01)
    *G06F 17/30*     (2006.01)

(52) U.S. Cl.
    CPC .......... *H04L 47/70* (2013.01); *G06F 17/3089* (2013.01)

(58) Field of Classification Search
    CPC ........................ H04L 47/70; G06F 17/3089
    USPC ....... 709/226, 227, 231, 213, 219, 233, 224, 709/203; 726/1; 725/96
    See application file for complete search history.

(56) References Cited

U.S. PATENT DOCUMENTS

| | | | |
|---|---|---|---|
| 6,647,396 B2 | 11/2003 | Parnell et al. | |
| 2003/0204562 A1 | 10/2003 | Hwang | |
| 2006/0059248 A1 | 3/2006 | Ikeda | |
| 2008/0016129 A1 | 1/2008 | Edlund et al. | |
| 2008/0021987 A1 | 1/2008 | Bates et al. | |
| 2008/0109307 A1* | 5/2008 | Ullah | G06Q 30/02 705/14.66 |
| 2008/0307107 A1* | 12/2008 | Chen et al. | 709/231 |

(Continued)

OTHER PUBLICATIONS

U.S. Appl. No. 13/352,598 Final Office Action, dated Feb. 6, 2015.

(Continued)

*Primary Examiner* — Thuong Nguyen
(74) *Attorney, Agent, or Firm* — Mollborn Patents Inc.; Fredrik Mollborn

(57) ABSTRACT

Methods for providing content management services in a Cloud computing environment. A content management application and associated content is distributed across a set of servers in a Cloud computing environment. Requests for Cloud content management services are received from requesters that are using the Cloud computing environment. The received requests are analyzed to determine an amount of resources needed for responding to the requests. Based on the results of the analysis and a predetermined set of rules, the content management application is dynamically replicated to additional servers within the Cloud computing environment. Any instance of the content management application is capable of replying to any received request so as to maintain a high throughput of the Cloud content management services.

5 Claims, 3 Drawing Sheets

(56) References Cited

U.S. PATENT DOCUMENTS

| | | | |
|---|---|---|---|
| 2009/0199250 A1* | 8/2009 | Assouline | H04N 7/173 725/96 |
| 2009/0276771 A1 | 11/2009 | Nickolov et al. | |
| 2009/0287750 A1* | 11/2009 | Banavar et al. | 707/204 |
| 2010/0088304 A1 | 4/2010 | Jackson | |
| 2010/0179987 A1 | 7/2010 | Sebastian et al. | |
| 2010/0223378 A1* | 9/2010 | Wei | 709/224 |
| 2010/0228819 A1* | 9/2010 | Wei | 709/203 |
| 2010/0333116 A1 | 12/2010 | Prahlad et al. | |
| 2011/0022812 A1 | 1/2011 | Van Der Linden et al. | |
| 2011/0078240 A1 | 3/2011 | Sivasubramanian et al. | |
| 2011/0078303 A1 | 3/2011 | Li et al. | |
| 2011/0138055 A1 | 6/2011 | Daly et al. | |
| 2011/0196828 A1 | 8/2011 | Drobychev et al. | |
| 2013/0036096 A1 | 2/2013 | Abdi | |
| 2013/0073473 A1* | 3/2013 | Heath | G06Q 30/02 705/319 |
| 2013/0185434 A1* | 7/2013 | Velasco | 709/226 |
| 2013/0215116 A1* | 8/2013 | Siddique | G06Q 30/0643 345/420 |
| 2016/0112453 A1 | 4/2016 | Martinez et al. | |

OTHER PUBLICATIONS

U.S. Appl. No. 13/352,598 Non-final Office Action, dated Oct. 10, 2014.

Fritz, Florian: "Maximization of resource utilization through dynamic provisioning and deprovisioning in the cloud." University of Stuttgart, Faculty of Computer Science, Electrical Engineering, and Information Technology, Diploma Thesis No. 3078 (2011). 71 pages.

Goudarzi, Hadi et al: "Multi-dimensional SLA-Based Resource Allocation for Multi-tier Cloud Computing Systems"; Cloud Computing (Cloud), 2011 IEEE International Conference on, IEEE, Jul. 4, 2011. pp. 324-331.

International Search Report and the Written Opinion of the International Searching Authority, or the Declaration. International application No. PCT/EP2013/050376. Date of the actual completion of the international search: Apr. 15, 2013.

Kolodner, Elliot K. et al: "A Cloud Environment for Data-intensive Storage Services"; Cloud Computing Technology and Science (CLOUDCOM). 2011 IEEE Third International Conference, on. IEEE. Nov. 29, 2011. pp. 357-366.

Maurer, Michael et al: "Enacting SLAs in Clouds Using Rules"; Aug. 29, 2011; EURO-PAR 2011 Parallel Processing, Springer Berlin Heidelberg,Berlin, Heidelberg. pp. 455-466.

U.S. Appl. No. 13/352,598 Non-final Office Action, dated Jul. 10, 2015.

USPTO Final Office Action. U.S. Appl. No. 13/352,598, dated Nov. 2, 2015.

U.S. Appl. No. 13/352,598 Office Action, dated Mar. 21, 2016.
U.S. Appl. No. 13/352,598 Office Action, dated Jul. 15, 2016.
U.S. Appl. No. 13/352,598 Office Action, dated Apr. 18, 2017.
U.S. Appl. No. 13/352,598 Office Action, dated Mar. 15, 2018.
U.S. Appl. No. 13/352,598 Office Action, dated Sep. 26, 2017.
USPTO Office Action. U.S. Appl. No. 13/352,598, dated Jul. 19, 2018.

U.S. Appl. No. 13/352,598 Office Action, dated Dec. 27, 2016.

* cited by examiner

CLOUD-BASED CONTENT MANAGEMENT SYSTEM

BACKGROUND

The present invention relates to Content Management Systems (CMSs), and more specifically, to Cloud-based CMSs. CMSs are used in collaborative environments, such as workplaces or various types of organizations to manage data and workflows. In a CMS, data can be defined as nearly anything: documents, movies, pictures, phone numbers, scientific data, and so forth. CMSs are frequently used for storing, controlling, revising, semantically enriching, and publishing documentation. CMSs can allow for a large number of people to contribute to and share stored data; control access to data, based on user roles (defining which information users or user groups can view, edit, publish, etc.); aid in easy storage and retrieval of data; reduce repetitive duplicate input; improve the ease of report writing; and improve communication between users, just to mention a few examples.

Typically, CMSs are implemented on various types of computer systems and include data stored in databases, along with analytical processing tools that can process the data to derive valuable results for the organization. Most CMSs are built on a client-server model, where each client initiates requests and transactions to a central server or a server in a farm of like configured servers hosting a managing layer of software for content. This client-server model is sometimes prone to causing bottlenecks or long transaction times when multiple requests are received simultaneously.

SUMMARY

According to one embodiment of the present invention, methods are described for providing content management services in a Cloud computing environment. A content management application and associated content is distributed across a set of servers in a Cloud computing environment. Requests for Cloud content management services are received from requesters that are using the Cloud computing environment. The received requests are analyzed to determine an amount of resources needed for responding to the requests. Based on the results of the analysis and a predetermined set of rules, the content management application is dynamically replicated to additional servers within the Cloud computing environment. Any instance of the content management application is capable of replying to any received request so as to maintain a high throughput of the Cloud content management services. The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

Figure 1:
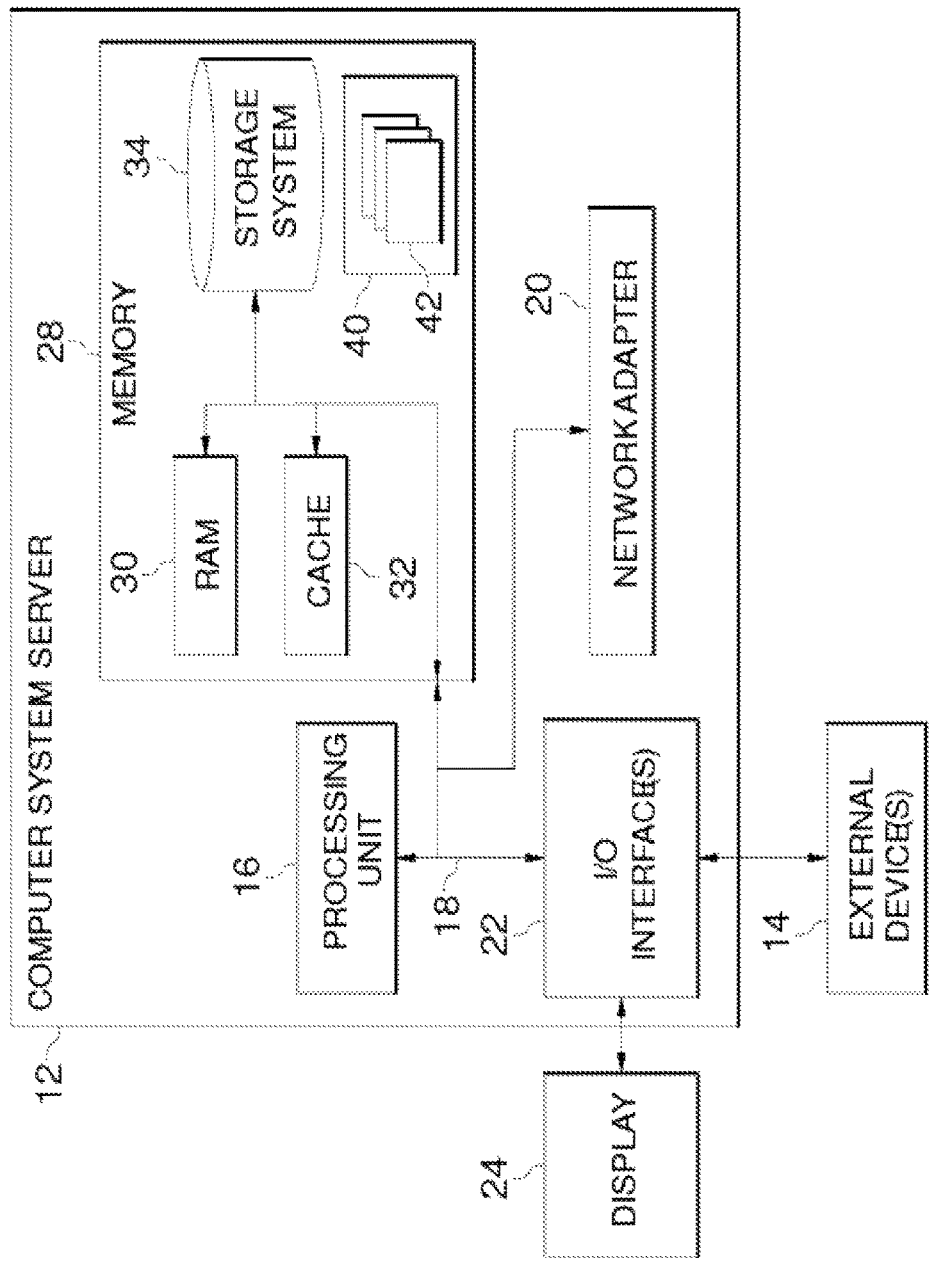
FIG. 1 depicts a cloud computing node according to an embodiment of the present invention.

The various embodiments of the present invention leverage the proliferation of Cloud computing infrastructure to CMS applications by providing methods and systems for cloud-distributed content management. By distributing content stores, search stores and index stores across local workstations and clouds of servers hosting applications, rather than central servers, as is done in conventional CMSs, and by coordinating version control among clients, a distributed solution can be accomplished that leverages peer-to-peer communication and reduces transaction times and bottlenecks on central servers. As will be described in further detail below, a central data store can be provided for compliance and recovery, but the content can be stored locally. In general, it is preferred that the content is retrieved from the local clients, as peer-to-peer connections typically can populate local requests faster than a remote server.

Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
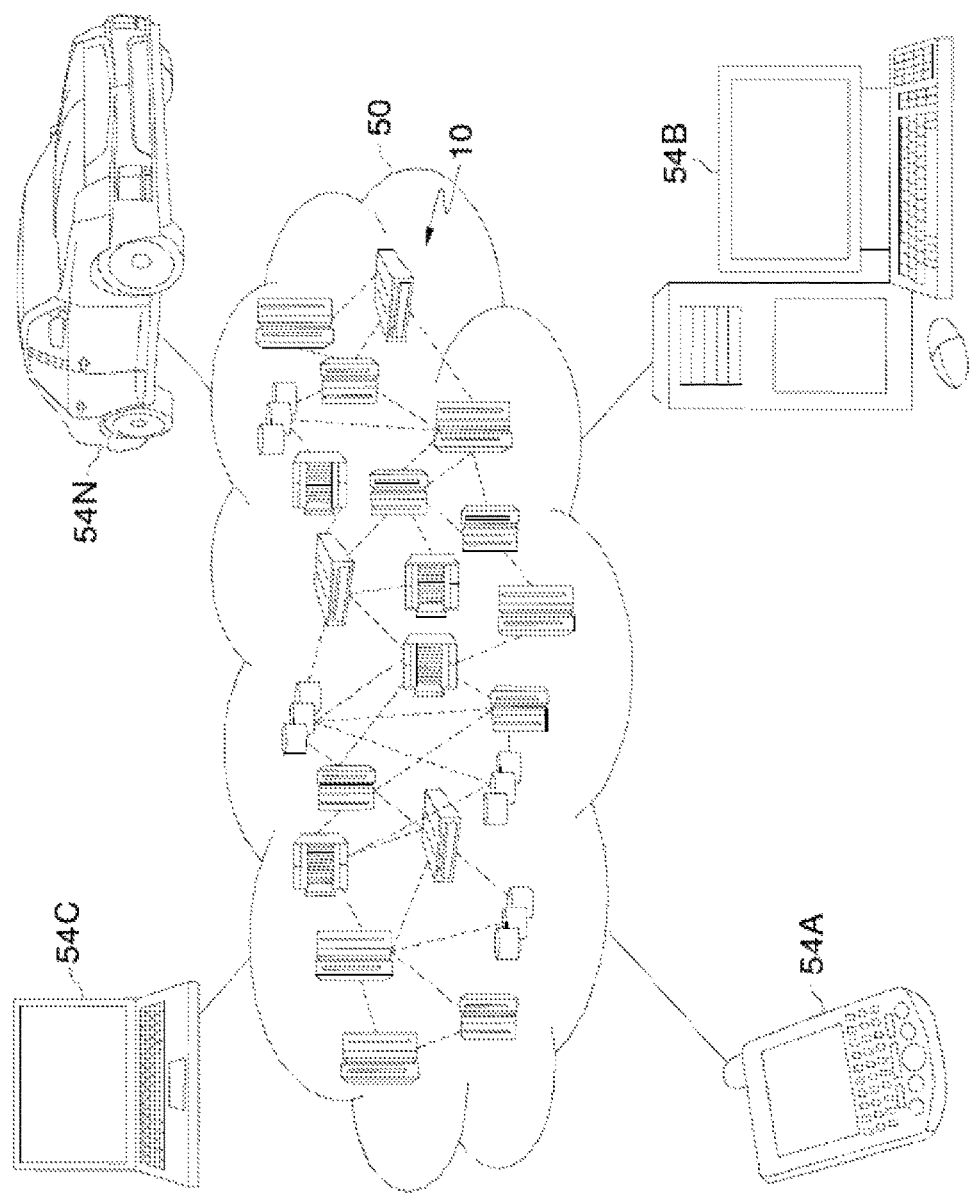
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
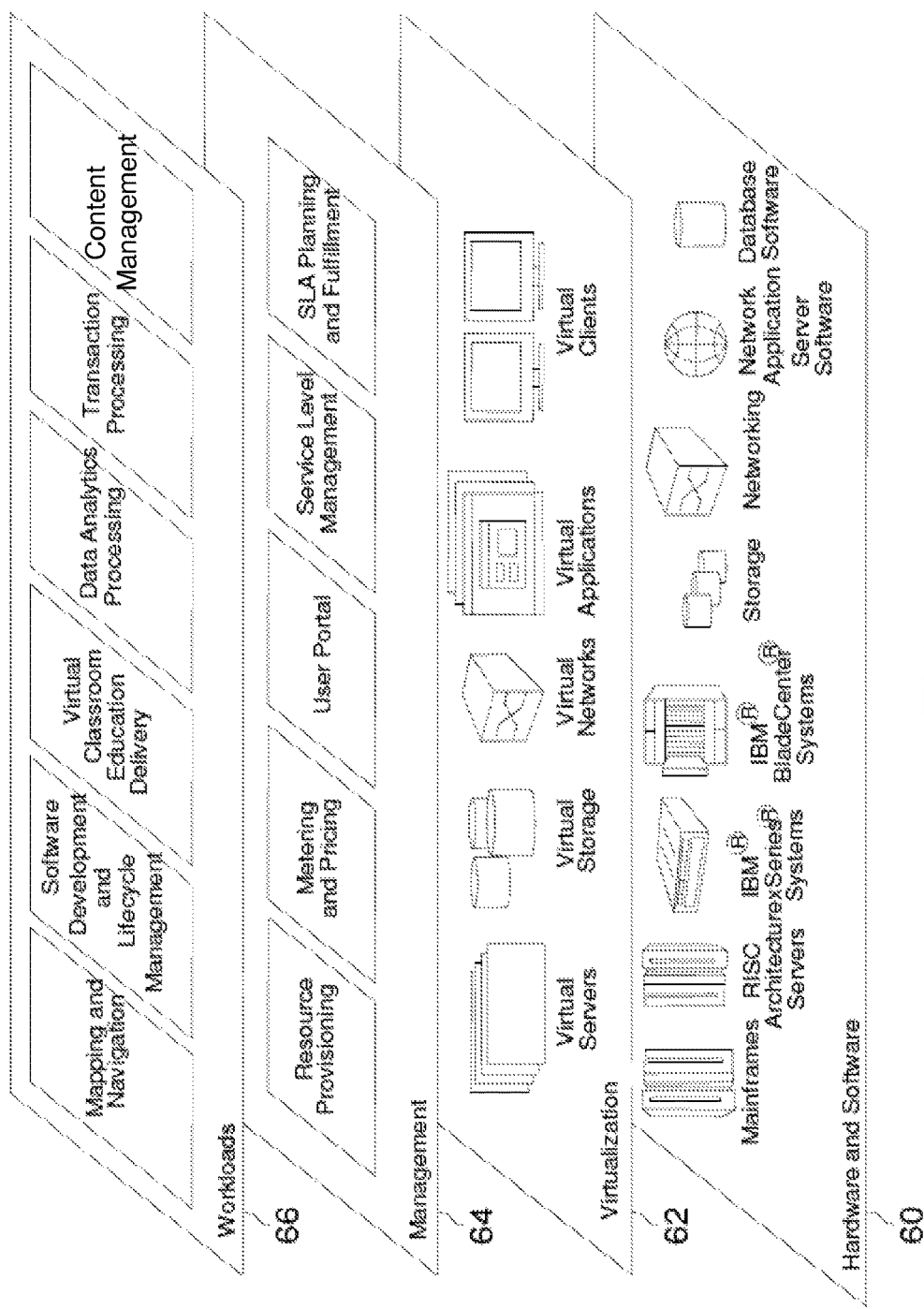
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and content management.

Content Management in a Cloud Computing Environment

In accordance with one embodiment, workloads layer 66 of the cloud computing environment provides a collaboration of individual cloud applications for storage of content, search data and indexes, and other metadata, so as to provide a cloud-based CMS. Any instance of a content management application running on a virtualized instance in the cloud can answer any request. As more requests come in from local computing devices 54A-N used by cloud consumers, the content management application replicates to additional cloud computing nodes 10 as needed to maintain throughput.

This means that the cloud-based content management application can have rules for replication, which tie into "intelligent resource allocation" themes, that is, the intelligent use of computing resources to solve problems using a proper amount of resources. For example in low-traffic environments, small amounts of virtualization can be used to conserve power and provide throughput. Yet in high traffic situations, the content management cloud application can bring up additional virtual instances to serve transactions and reduce the load on the system.

Various algorithms can be used to balance throughput for the system and virtual instance allocation using other metrics that may be applicable for intelligent resource allocation such as power consumption, or shared resource contention among other virtual systems. This can be expanded to include any type of deterministic events (for example, expanding the cloud during U.S. business hours), or non-deterministic events (for example, expanding the cloud when transactions go above 2500/sec).

In some embodiments, content that is not stored on local clients is downloaded from a cloud application instance to the local client. Once a local client has received the content, the local client can distribute the content to peer clients as needed for clients requesting the same content. In some embodiments, this can be extended to include predictive analytics to drive prefetching of content. For example, in a team of testers, if one team member checks in a test plan, chances are that the other team members will need to access the test plan at some point. In such a situation, the cloud-based CMS can anticipate this and pre-fetch the test plan to the other team members' computers. Thus, when the other team members access the test plan, they may think they are downloading it from the CMS, whereas in actuality the test plan has been staged in advance on their respective individual computers.

Various types of social algorithms for determining how and where content is typically distributed in a network of individuals can be used in the predictive analytics. For example, analysis of instant communication (same-time or email) usage, meeting attendance, and job roles can be used in various algorithms to make content available to various individuals.

In some embodiments, content can also be split and/or migrated automatically to new content repositories as needed, for example, in response to content repository population size. As content repositories are loaded with content they tend to experience problems when they store too much data. For example, backups take longer, searches and inserts can take longer, filing content in a hierarchy gets more complex when there are large amounts of content in the system. By enabling a content repository to split into several smaller content repositories that are easier to backup and search, these types of issues can be mitigated or completely eliminated. The user is still presented with a way to view the content as if it were still stored in a single content repository. In various embodiments, this can be done, for example, by including folders and content from multiple repositories in the same result set for a search or UI from a thin-client usage. Searches can be configured to fan out over multiple repositories on the backend, or front-end applications can be configured to automatically include selected repositories when searching or displaying a UI.

For performance reasons, in some embodiments, several different data fetching pipes or objects can be used to retrieve and display data. For example, in a situation where there are multiple repositories and many different search objects are used to scour the repositories, some repositories will return results faster than others. These results can be displayed immediately to the user and be combined when all results are returned, which gives the user a perception of fast performance, while at the same time ensuring that all the data is found. A restrictive search, where a combined and collated set of search results is desired combines results from the different repositories, yet will result in slower performance awaiting results from all repositories.

In some embodiments, a configurable metric or policy can be set up for splitting content. For example, administrators of the CMS could set up a policy that would automatically start the process of creating a new content repository in the CMS if content is too large, response times are too slow, etc. Deterministic and non-deterministic policies (or any combination of the two) can be used when evaluating these metrics to create an intelligent way to split content between repositories, for example if this should occur only during 8 am-5 pm EST, or during 8 am-5 pm EST but only if connections are greater than 500.

Some embodiments also include converse functionality for merging repositories, for example, in response to a situation where the content has shrunk. Similar to the splitting of content, various types and combinations of deterministic and non-deterministic policies and metrics can be used for merging content, so that an efficient use of resources can be obtained.

Yet further embodiments also include functionality for instructing a content repository to not participate in splitting or merging. This may be desirable, for example, if a content repository contains information that is considered to be "sensitive" for one reason or another.

In a CMS content can exist and migration applied in a number of ways. An individual piece of content, such as a document or a video, can be submitted to the CMS. This piece of content can be broken up and distributed or merged using methods described herein. Most content in a CMS can be represented as a grouping of individual pieces of content in a construct signifying a logical grouping of individual pieces of content such as a folder with a descriptive name, which can again be broken up and merged using methods described herein. The highest level of grouping of content is in a content repository construct. This is an architectural grouping of content to which the methods for splitting and merging of content can also be applied. Content in a CMS is stored at some location and typically a server running the CMS application will need to have access to the content in order to provide the content to users when it is requested. Using the methods described herein, content can be split/merged and migrated (whether in individual pieces, logical constructs, or content repositories) across servers in the Cloud computing environment.

It should be noted that the techniques described above are merely some examples of how content can be split, and that many alternatives can be envisioned by those of ordinary skill in the art. For example, in some alternative embodiments, links can be created when content is split, such that when content is retrieved from a content repository that has been split, a link directs the user to the new location of the content that has been split off from the original content repository.

A Use Scenario

As the skilled person realizes, there are many ways in which the CMS can be implemented in a cloud based environment. In one embodiment, a "thick background client" approach can be combined with a "thin client" presentation. In such an implementation, the thick client pieces perform work intensive tasks, such as document fetching and broadcasting, for example, while the thin client does the presentation. This use scenario describes an example of how a user would interact with the CMS in such an implementation.

Users add content through a thin-client application (or custom application, API interface, mobile device, etc.), similar to what is typically done in conventional CMSs. The central server of the CMS receives a copy of the content upon check-in of any revision, in order to ensure that a copy of the revision can always be obtained from somewhere, as a last resort.

After the content is uploaded, the content is broken up and transmitted to one or more repositories in the CMS. How big the individual pieces of content are and when the split occurs can be defined by an administrator of the CMS, if needed.

These tasks can be performed, for example, by the thick background clients described above.

In some embodiments, a table can be used in the CMS to track changes and location information of content and define where all the pieces of content can be retrieved. Preferably, the table also includes information about the version of the content, such as a revision number, or similar information. When a user client attempts to retrieve content, the table is referenced to determine where the correct versions of the content can be found, and the client can subsequently retrieve the content from the appropriate locations.

In other embodiments, the CMS can be configured such that user clients do peer-to-peer broadcasting, similar to how our computers do broadcasts in the network to see who answers to an address. That is, the user client can broadcast to determine which client in the CMS has a certain piece of content (or any pieces of a file the user needs). The user client then finds these pieces and commences download and assembly of the content. From the user's perspective, however, the appearance is very similar to a conventional CMS user interface. The user is not aware that they are receiving content from peers, or that the content they upload is being broken up, since all of these operations occur on the backend of the CMS. Further, with the successful implementation of the social algorithm prefetch, the broadcast and assembly can occur even before the user wants to retrieve a document or other piece of content.

CONCLUDING COMMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method in a content management system for providing content management services, comprising:
   providing content management services in a Cloud computing environment, wherein the Cloud computing environment includes one or more servers storing content items to be accessed by clients through a workloads abstraction layer;
   dynamically creating instances of a content management application in the workloads abstraction layer to reply to received requests for content items stored on servers in the Cloud computing environment;
   determining, by an instance of the content management application, based on a received request from a client for a content item and based on a social algorithm, which other client is likely to request the same content item;
   determining on which servers in the Cloud computing environment one or more pieces of the requested content item are located, the one or more pieces together forming the requested content item;
   retrieving the one or more pieces of the requested content from the servers;
   prior to the other client requesting the content item, distributing the content item to the client and to the other client, respectively; and
   assembling the one or more retrieved pieces of the requested content on the client and on the other client, respectively.

2. The method of claim 1, further comprising:
   automatically migrating individual content items or repositories of content between servers within the Cloud computing environment, based on one or more of: the size of the content items and the storage capabilities of the individual servers in the Cloud computing environment.

3. The method of claim 2, wherein migrating individual content items includes:
   in response to a deterministic or non-deterministic event, dividing singular content items or repositories of content, stored on a server in the Cloud computing environment into two or more content items or repositories, respectively; and
   storing at least one of the divided content items or divided repositories on another server in the Cloud computing environment.

4. The method of claim 2, wherein migrating individual content items includes:
   in response to a deterministic or non-deterministic event, merging content items or repositories of content that are stored on a plurality of servers in the Cloud computing environment; and
   storing the merged content items or repositories on a smaller subset of the plurality of servers in the Cloud computing environment.

5. The method of claim 1, further comprising:
   receiving, at a central server in the Cloud computing environment, a content item from a client;
   attaching a version identifier to the content item;
   dividing the content item into two or more pieces; and
   distributing the pieces with attached version identifiers to other servers in the Cloud computing environment.

* * * * *